(12) United States Patent
Roidl et al.

(10) Patent No.: US 8,783,306 B2
(45) Date of Patent: Jul. 22, 2014

(54) DEVICE FOR DELIVERING LIQUIDS

(75) Inventors: Wolfgang Roidl, Deuerling (DE); Stefan Poeschl, Regensburg (DE)

(73) Assignee: Krones AG (DE)

( * ) Notice: Subject to any disclaimer, the term of this patent is extended or adjusted under 35 U.S.C. 154(b) by 380 days.

(21) Appl. No.: 13/252,878

(22) Filed: Oct. 4, 2011

(65) Prior Publication Data

US 2012/0085460 A1  Apr. 12, 2012

(30) Foreign Application Priority Data

Oct. 5, 2010 (DE) .......................... 10 2010 047 365

(51) Int. Cl.
*B67C 3/28* (2006.01)

(52) U.S. Cl.
CPC ....................................... *B67C 3/286* (2013.01)
USPC .............. 141/95; 141/198; 141/302; 141/392

(58) Field of Classification Search
CPC ............ B67C 3/28; B67C 3/282; B67C 3/286
USPC ....................... 141/94–95, 301–302, 392, 198
See application file for complete search history.

(56) References Cited

U.S. PATENT DOCUMENTS

| | | | |
|---|---|---|---|
| 1,757,059 A | 5/1930 | Rickenberg | ............. F16K 31/06 |
| 4,349,042 A * | 9/1982 | Shimizu | ........................... 137/39 |
| 5,492,449 A * | 2/1996 | Hunklinger et al. | ........... 417/259 |
| 6,533,001 B1 * | 3/2003 | Adriansens et al. | ........... 141/145 |
| 6,578,604 B1 | 6/2003 | Adriansens | ................. 137/614.2 |
| 7,424,995 B2 | 9/2008 | Oh et al. | ...................... 251/129.1 |
| 7,690,625 B2 * | 4/2010 | Sabiron et al. | ............ 251/129.14 |
| 2002/0017324 A1 * | 2/2002 | Hisamura et al. | .............. 137/554 |
| 2006/0151732 A1 | 7/2006 | Oh et al. | ..................... 251/129.1 |
| 2010/0307638 A1 | 12/2010 | Poeschel et al. | ................. 141/94 |

FOREIGN PATENT DOCUMENTS

| | | | |
|---|---|---|---|
| DE | 1828263 | 3/1961 | |
| DE | 3600012 | 2/1987 | ............. A47G 19/24 |
| DE | 10249937 | 5/2004 | ............ F16K 11/056 |
| DE | 102005043027 | 3/2007 | ............... A47L 15/42 |
| DE | 60 2005 003 195 | 2/2008 | ............... F16K 31/06 |
| DE | 60036913 | 8/2008 | ................ B67C 3/28 |
| DE | 10 2007 048 934 | 4/2009 | ................ B67C 3/28 |
| DE | 102009012822 | 9/2010 | ............ F16K 11/044 |

OTHER PUBLICATIONS

European Office Action, dated Jan. 25, 2012 (5 pgs).
Translation of relevant portions of previously submitted European Office Action, dated Jan. 25, 2012 (2 pgs).
German Search Report, dated Sep. 29, 2011 (8 pgs).

\* cited by examiner

*Primary Examiner* — Gregory Huson
*Assistant Examiner* — Nicolas A Arnett
(74) *Attorney, Agent, or Firm* — Hayes Soloway P.C.

(57) ABSTRACT

A device for delivering liquids and in particular beverages, comprising a feed line, which is flow-connected to a dispensing chamber for the liquid and which delivers the liquid to the dispensing chamber, a first discharge line, which is flow-connected to the dispensing chamber and which drains the liquid from the dispensing chamber, and a second discharge line, which is flow-connected to the dispensing chamber and which drains the liquid from the dispensing chamber. A valve body is arranged in the dispensing chamber, the valve body comprising a magnetizable material and being moveable in relation to the dispensing chamber, and the valve body being suited to at least partially closing at least one discharge line, and a magnetic element for moving the valve body being provided outside the dispensing chamber.

21 Claims, 3 Drawing Sheets

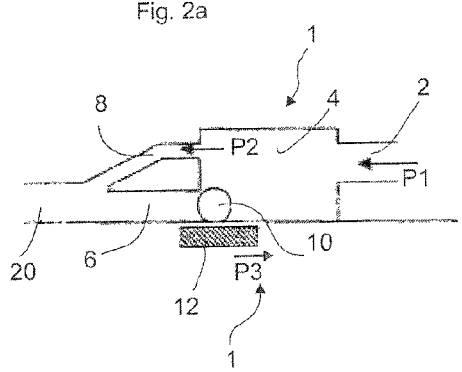
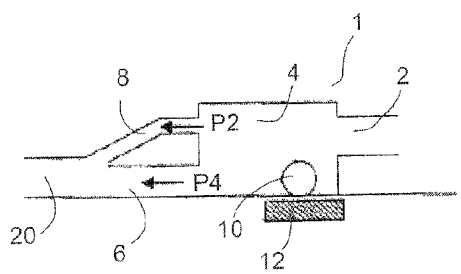
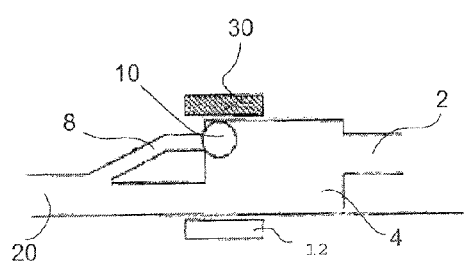
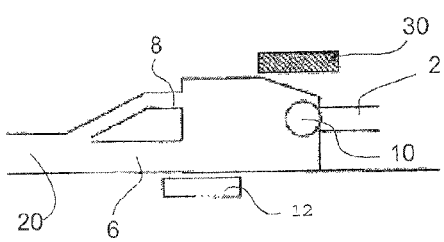
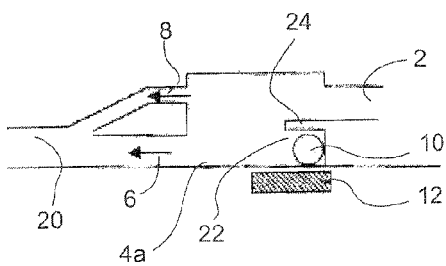

DEVICE FOR DELIVERING LIQUIDS

BACKGROUND OF THE INVENTION

The present invention relates to the field of filling technology and in particular to the dispensing of liquids or beverages into containers. Such devices for dispensing beverages into containers have long been known in the prior art. It is usual here for these devices to comprise filling lines, which deliver the liquid from a reservoir to the filling elements. Restrictors, which serve for regulating the liquid feed, are often situated in these feed lines. In the prior art, controllable diaphragm valves, for example, are often used for this purpose, in order to achieve two different filling rates. These diaphragm valves have the disadvantage, however, that the diaphragms are subject to wear and also that the flow rate is limited. To be more specific, the service life of such diaphragms is less than 6,000 hours.

DE 36 00 012 A1 discloses a device for the proportioned delivery of finely dispersed, microscopic material and fluid substances. Arranged in the path of the filled material at a charging aperture in this device is a moveable valve body, which under the gravitational force acting on it during the dispensing process opens the path of the filled material to the discharge aperture and on return to the charging aperture closes a passage aperture for the filled material.

DE 60 2005 003 195 T2 describes a valve, this valve being embodied as a ball valve, which relies on electromagnetic actuation.

DE 10 2007 048 934 A1 discloses a device for dispensing beverages, a valve unit, which automatically switches between an opened position and a closed position as a function of a rate of flow, being arranged in conveying line between a storage container and a filling unit.

The object of the present invention is to eliminate the aforesaid disadvantages and in particular to provide a restrictor unit with reduced wear.

SUMMARY OF THE INVENTION

A device according to the invention for delivering liquids and in particular beverages comprises a feed line, which is flow-connected to a dispensing chamber for the liquid and which delivers the liquid to the dispensing chamber. The device further comprises a first discharge line, which is likewise flow-connected to the dispensing chamber and which drains the liquid from the dispensing chamber. In addition a second discharge line is provided, which is flow-connected to the dispensing chamber and which drains the liquid from the dispensing chamber.

According to the invention a valve body is arranged in the dispensing chamber, the valve body comprising a magnetizable material and being moveable in relation to the dispensing chamber, and the valve body being suited to at least partially closing at least one discharge line, and a magnetic element for moving the valve body being provided outside the dispensing chamber.

Leaving the dispensing chamber, therefore, the liquid is distributed to at least the first discharge line and the second discharge line. Here the dispensing chamber is advantageously closed, apart from said flow connections to the feed line and the discharge line. Through corresponding switching and movement of the valve body, the device according to the invention thereby allows a restriction of the liquid flow, for example by closing one discharge line. The device according to the invention is largely free of wear and furthermore no increased loads (either chemical or mechanical) act on the components. The valve body is advantageously composed of a magnetizable material, so that it can be attracted or repelled by magnets.

The device according to the invention thereby advantageously involves a controllable restrictor, which can be switched by means of magnetic force, the valve body, as mentioned above, in turn being externally held by a magnet. Here the magnet may be a permanent magnet or also an electromagnet.

In a further advantageous embodiment a flow connection between the first discharge line and the dispensing chamber and a flow connection between the second discharge line and the dispensing chamber are separated by a distance from one another. The distance is advantageously greater than the radius of a valve body and more preferably greater than the diameter of the valve body, particularly if the valve body takes the form of a ball. This serves to ensure that when one of the two feed lines is closed by the valve body, the flow of liquid through the other feed line is not impeded by the valve body.

The two discharge lines, or at least some portions thereof, are also preferably separated by a distance from one another. In a further advantageous embodiment the magnetic element is also moveable in relation to the dispensing chamber. A movement of the magnetic element outside the dispensing chamber is thus capable of also achieving a movement of the valve body inside the dispensing chamber and thereby of bringing the device into different switching positions. It would also be possible, however, for the fluid connection of the first discharge line to the dispensing chamber and the fluid connection of the second discharge line to the dispensing chamber to merge with one another and for the valve body to cover only a part of the overall flow connection thus formed.

It would also be feasible to provide multiple, in particular switchable magnets, such as electromagnets, and to bring the valve body into various positions through corresponding switching. In a further advantageous embodiment the valve body is also suited to at least partially closing the other discharge line. In this embodiment the one or the other discharge line may be selectively closed by the valve body. It would furthermore also be feasible to make the valve body suited to closing the feed line, either in addition or as an alternative. In this case the valve could be opened and closed and might also be operated with two different flow cross sections.

The valve body can advantageously move in an axial direction inside the dispensing chamber or product chamber.

In a further advantageous embodiment the discharge lines, or at least some portions thereof, have a different flow cross section. Here, this different flow cross section may already be present on the flow connection to the dispensing chamber, although a subsequent narrowing of the flow cross section would also be feasible. In this way two different rates of passage can be achieved. Thus it is possible, in addition, to additionally arrange a bypass with a main pipeline, it being possible, as mentioned above, to bring the valve body into two or more positions.

Thus, in a first position of the valve body, for example, the first discharge line or the main line may be open, or the valve body may be situated far enough away from the aperture, so that the product or the liquid can flow rapidly through the device, that is to say the restrictor. If in this case the valve body is also separated by a distance from the aperture of the second discharge line, the product is able to flow both through the main line and through the restriction bore or the bypass. In a second position the valve body, for example, may close the first feed line, that is to say the main line, so that the liquid can now flow only through the bypass or the restriction bore.

In a further advantageous embodiment the dispensing chamber or an inside wall of the dispensing chamber forms a running surface for the valve body. This means that the valve body can be displaced or rolls along this running surface, in order to close or to open a discharge line, for example.

In a further advantageous embodiment the valve body is a spherical body. The advantage in using a spherical body is that this is comparatively easy to move inside the dispensing chamber and is furthermore capable, by virtue of its surface, of largely closing the discharge lines. It is particularly advantageous if the flow connections between the discharge lines and the dispensing chamber have a substantially circular cross section.

However, the valve body could also conceivably be of cylindrical design, for example.

In a further advantageous embodiment the dispensing chamber at least partially comprises a non-magnetic material.

In a further advantageous embodiment the valve body serves for varying a liquid flow cross section extending from the feed line to the discharge lines.

The valve body thereby here serves, in particular, for restricting the flow through the device according to the invention.

In a further advantageous embodiment a receiving chamber for at least partially receiving the valve body is arranged inside the dispensing chamber. This receiving chamber is capable of ensuring that the valve body, in a resting position, does not impede the flow of liquid through the dispensing chamber.

It is also possible here that the valve body, in one position, does not cover either the first discharge line or the second discharge line. In this embodiment three different switching positions of the device according to the invention and hence also three different filling rates are feasible.

The present invention further relates to a device for dispensing liquids and in particular beverages into containers, this device comprising a filling unit, which fills the containers with the liquid, and at least one device for delivering liquids of the type described above, arranged upstream of the filling unit in a direction of flow of the liquid.

BRIEF DESCRIPTION OF THE DRAWINGS

Further advantages and embodiments will be apparent from the drawings attached, of which:

FIGS. 2a, 2b show two schematic representations of a device according to the invention in a first embodiment;

FIGS. 3a, 3b show representations of a device according to the invention in a second embodiment;

FIG. 4 shows a schematic representation of a device according to the invention in a third embodiment.

DETAILED DESCRIPTION OF THE INVENTION

Figure 1:
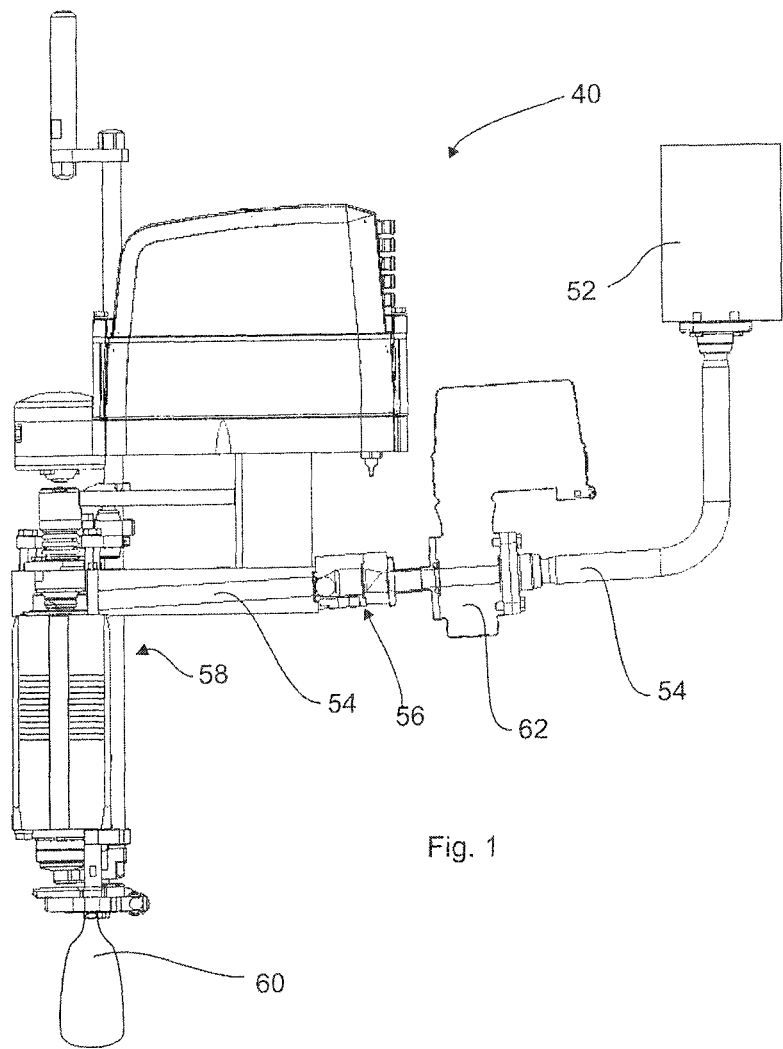
FIG. 1 shows a device for filling containers according to the prior art.
Figure 5A:
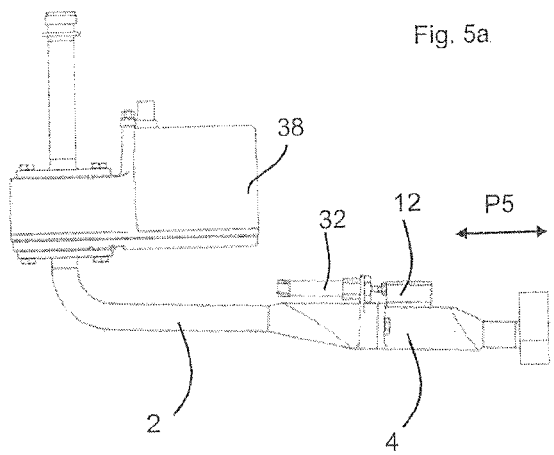
FIGS. 5a-5d show four representations of a device according to the invention.
Figure 5B:
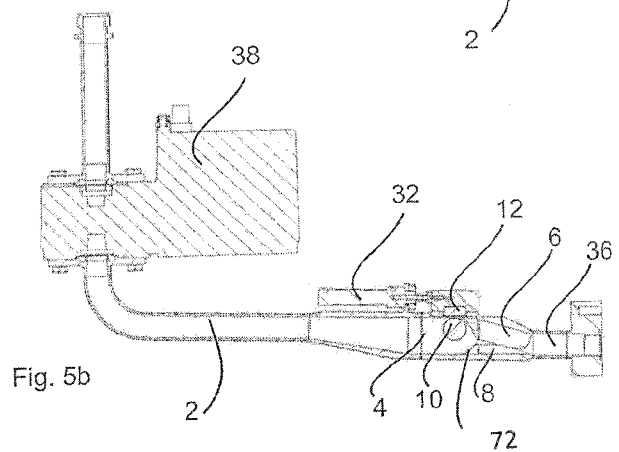
Figure 5C:
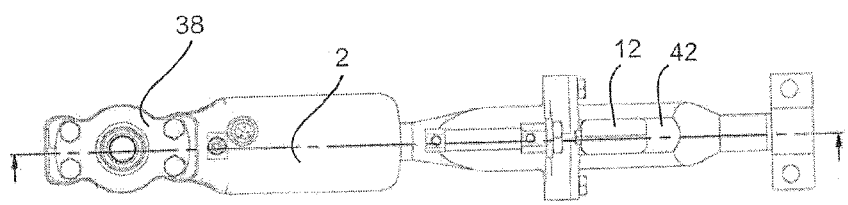
Figure 5D:
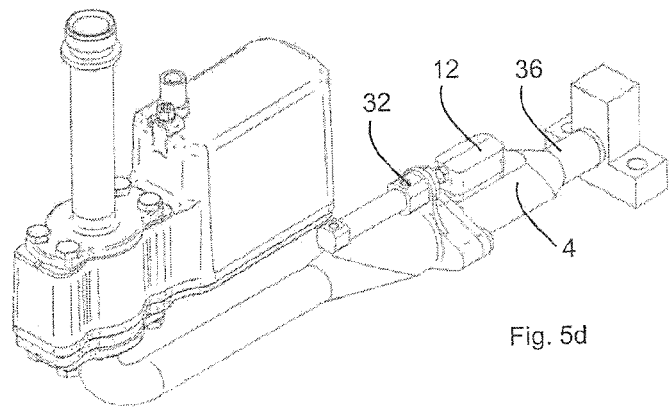

FIG. 1 shows an overall representation of a device 40 for filling containers according to the prior art. Here the reference numeral 52 refers to a storage container (represented only schematically), from which the medium or the beverage is dispensed into the containers 60 via a conveying line 54. The reference numeral 58 refers to a filling unit, which delivers the liquid into the containers 60. A restrictor unit for the liquid may be provided in the conveying line 54. The reference numeral 62 identifies a flow meter. A valve unit 56 may serve to control the supply of liquid to the filling unit 58.

FIGS. 2a and 2b show two schematic representations of a device according to the invention in two different switching positions. Here, a feed line 2 is provided, via which liquid is carried along the arrow P1 into a dispensing chamber 4. Connected to this dispensing chamber 4 are a first discharge line 6 and a second discharge line 8. Here, the first discharge line 6 has a larger flow cross section than the second discharge line 8, as can be seen from FIGS. 2a and 2b. The liquid is therefore discharged in the direction of the arrows P2 and P4 (cf. FIG. 2b).

Also arranged inside the dispensing chamber 4 is a valve body 10 in the form of a ball, which is moveable in relation to the dispensing chamber 4. Here, however, the cross section of this valve body is selected so that this cannot escape from the dispensing chamber through the inlet or one of the outlets. The reference numeral 20 refers to a main discharge line for the liquid. The cross section of the feed line 2 and of the two discharge lines 6, 8 is therefore preferably smaller than that of the ball 10.

A magnetic element 12, for example a permanent magnet or an electromagnet, is arranged outside the dispensing chamber 4. Here, this magnetic element is displaceable in relation to the dispensing chamber 4 along the arrow P3. In the situation shown in FIG. 2a the valve body 10 closes the first discharge line 6. The liquid can thereby pass out of the dispensing chamber only through the second discharge line 8.

In the situation shown in FIG. 2b the magnet 12 has been displaced towards the right and the two discharge lines 6 and 8 are thereby exposed for passage of the liquid.

Here the ball 10 can thereby be brought into position by the magnet 12 in such a way that either a passage area having a small cross section (cf. FIG. 2a), or a passage area having a small cross section and a passage area having a large cross section is exposed. In this way two different restrictor positions of the device 1 are possible. Here the magnet 12 can be displaced manually or also by corresponding actuating units (pneumatic, electric motor, etc.). The actuating unit is preferably embodied as an electric motor, for example as a stepping motor or a linear servomotor. The restrictor position can thereby be set in any desired position. It can further be seen here that the feed line 2 is height-offset in relation to the first discharge line 6. In this way it is possible to ensure that if the ball 10 is situated in the right-hand position shown in FIG. 2b, the flow of liquid through the dispensing chamber is not impeded by the ball, and also, on the other hand, that the risk is reduced of the valve body 10 or the ball being entrained by the flow, in opposition to the force of the magnet 12.

FIGS. 3a and 3b show a further embodiment of the device according to the invention. In this embodiment a second magnet 30 is additionally provided, so that it is possible to run also to a third position, or the valve body 10 can also close just the second discharge line 8. In this way it is possible to allow opening not only of the discharge line 6 or the discharge lines 6 and 8, but also of either the feed line 2, or the discharge line 6, or the discharge lines 6 and 8.

This could also be achieved by using magnets 12, 30 in the form of electromagnets, which are correspondingly activated. It would also be possible to dispense with the second magnet 30, if the ball and the first magnet 12 are matched to one another in such a way that a repelling force or an attraction force can be selectively generated by different polarities.

Furthermore it would also be feasible for the second magnet 30 also to be moveable, as illustrated in FIG. 3b. In this case a fourth position, in which the valve body 10 closes the feed line 2 and hence the valve, can additionally be attained.

FIG. 4 shows a further embodiment of a device according to the invention. It will be seen that here, inside the dispensing chamber there is in addition a wall 24, forming a receiving chamber 22, which the valve body 10 can enter. This serves to optimize the fluid mechanics when, in a fully opened position, the ball 10 disappears under the cover 24.

It would furthermore also be possible for the valve and the dispensing chamber 4 to be designed in the form of a cylinder. In such an embodiment, an electromagnet, which can be run along the outer wall of this cylinder, will suffice for adjusting the position of the ball. It will further be seen that, in contrast to what is shown in FIG. 4, the lower wall 4a of the dispensing chamber is advantageously arranged below the first discharge line 6, in order that the ball can close the discharge line 6. It would furthermore also be feasible in each case to provide bevelled faces or entry bevels on the inside wall of the dispensing chamber 4a, so that the ball in this way sits as if it were in a valve seat and can cover the respective discharge lines 6 and 8.

FIGS. 5a-5d show four detailed representations of a device according to the invention. These again show the feed line 2, which opens into the dispensing chamber 4. The reference numeral 38 refers to a flow meter. The reference numeral 32 identifies a drive unit, which serves for moving the magnet 12 along the double arrow P5. The drive unit may be a pneumatic drive unit, for example.

The ball 10 can likewise be moved inside the dispensing chamber (cf. FIG. 5b) by a movement of the magnet. Here, it is possible, depending on the position of the magnet 12 and hence also of the ball, selectively to close the first discharge line 6 or the second discharge line 8 (or also to leave both discharge lines 6, 8 open). The reference numeral 36 identifies a collecting line, into which both the discharge line 6 and the discharge line 8 open.

Here, the magnet 12 is moveable inside a guide 42. The reference numeral 72 (FIG. 5b) identifies a contact face, against which the ball 10 bears when it is closing the second discharge line 8. Here, a radius of curvature of this face is preferably matched to a radius of curvature of the ball 10.

The applicant reserves the right to claim all features disclosed in the application documents as essential for the invention, in so far as, individually or in combination, they are novel compared to the prior art.

LIST OF REFERENCE NUMERALS 1 device
2 feed line
4 dispensing chamber, valve chamber
6 first discharge line
8 second discharge line
10 valve body, ball
12 magnetic element, magnet
20 main discharge line
22 receiving chamber
24 wall, cover
30 magnet
32 drive unit
36 collecting line
38 flow meter
40 device for dispensing liquids into containers
42 guide
52 storage container
54 conveying line
56 valve unit
58 filling unit
60 container
62 contact face
P1,P2 arrow
P3,P4 arrow
P5 arrow

The invention claimed is:

1. A device for delivering liquids, comprising a feed line, which is flow-connected to a dispensing chamber for the liquid and which delivers the liquid to the dispensing chamber, a first discharge line, which is flow-connected to the dispensing chamber and which drains the liquid from the dispensing chamber, and a second discharge line, which is flow-connected to the dispensing chamber and which drains the liquid from the dispensing chamber,
wherein
a valve body is arranged in the dispensing chamber, the valve body comprising a magnetizable material and being moveable in relation to the dispensing chamber, and the valve body being configured to at least partially close at least one discharge line, and a magnetic element for moving the valve body being provided outside the dispensing chamber, wherein the valve body is also configured to at least partially close the other discharge line.

2. The device according to claim 1, wherein a flow connection between the first discharge line and the dispensing chamber and a flow connection between the second discharge line and the dispensing chamber are separated by a distance from one another.

3. The device according to claim 2, wherein the dispensing chamber or an inside wall of the dispensing chamber forms a running surface for the valve body.

4. The device according to claim 3, wherein the valve body rolls along the running surface on order to close or to open a discharge line.

5. The device according to claim 1, wherein the magnetic element is moveable in relation to the dispensing chamber.

6. The device according to claim 5, wherein a movement of the magnetic element outside the dispensing chamber achieves a movement of the valve body inside the dispensing chamber.

7. The device according to claim 1, wherein the discharge lines, or at least some portions thereof, have a different flow cross sections.

8. The device according to claim 1, wherein the dispensing chamber forms a running surface for the valve body.

9. The device according to claim 1, wherein the valve body is a spherical body.

10. The device according to claim 1, wherein the valve body serves for varying a liquid flow cross section extending from the feed line to the discharge lines.

11. The device according to claim 1, wherein a receiving chamber for at least partially receiving the valve body is arranged inside the dispensing chamber.

12. A device for dispensing liquids into containers, comprising a filling unit, which fills the containers with the liquid, and at least one device for delivering liquids according to claim 1, arranged upstream of the filling unit in a direction of flow of the liquid.

13. The device according to claim 1, wherein the first or the second discharge line may be selectively flow-connected by the same valve body.

14. The device according to claim 1, wherein the device comprises a single valve body.

15. The device according to claim 1, wherein the dispensing chamber at least partially comprises a non-magnetic material.

16. The device according to claim 1, wherein a receiving chamber for at least partially receiving the valve body is arranged inside the dispensing chamber.

17. The device according to claim 16, wherein a wall is arranged inside the dispensing chamber to form the receiving chamber.

18. The device according to claim 1, wherein the valve body in one position does not cover either the first discharge line or the second discharge line.

19. The device according to claim 1, wherein a cross section of the valve body is such that it cannot escape from the dispensing chamber through the inlet or one of the outlets.

20. The device according to claim 1, wherein the feed line is height-offset in relation to the first discharge line.

21. The device according to claim 1, wherein the device comprises a second magnet for moving the value body.

* * * * *